United States Patent [19]

Allen

[11] Patent Number: 5,687,321

[45] Date of Patent: Nov. 11, 1997

[54] METHOD AND APPARATUS FOR TRANSMITTING SIGNALS OVER A WIRE PAIR HAVING ACTIVITY DETECTION CAPABILITY

[75] Inventor: Charles M. Allen, Sunnyvale, Calif.

[73] Assignee: Maxim Integrated Products, Sunnyvale, Calif.

[21] Appl. No.: 365,222

[22] Filed: Dec. 28, 1994

[51] Int. Cl.$^6$ .................. H04L 25/06; H04L 25/10; H03K 3/013; H03K 5/22

[52] U.S. Cl. .................. 395/200.11; 395/200.2; 371/63; 327/65; 327/72

[58] Field of Search .................. 395/200.11, 200.13, 395/200.14, 200.2, 185.02, 838; 371/63; 364/266, 266.6, 514.8; 327/65, 72, 60, 62, 74, 76; 370/13, 17, 85.2, 85.3; 340/825.5

[56] References Cited

U.S. PATENT DOCUMENTS

| | | |
|---|---|---|
| 3,969,683 | 7/1976 | Fabricius . |
| 4,063,220 | 12/1977 | Metcalfe et al. .................. 340/825.5 |
| 4,683,471 | 7/1987 | Blackstone .................. 340/825.5 |
| 4,706,082 | 11/1987 | Miesterfeld et al. .................. 340/825.5 |
| 4,847,837 | 7/1989 | Morales et al. . |
| 4,924,117 | 5/1990 | Tamaru . |
| 4,933,869 | 6/1990 | Gareis et al. . |
| 5,179,577 | 1/1993 | Ilyadis . |
| 5,285,477 | 2/1994 | Leonowich . |
| 5,440,253 | 8/1995 | Araya . |
| 5,448,200 | 9/1995 | Fernandez et al. . |

OTHER PUBLICATIONS

Texas Instruments; Data Sheet for SN75ALS180; Data Transmission Circuits Data Book (Line Drivers, Receivers, Transceivers, UARTs); pp. 2-675-2-685; USA, 1993.

*Primary Examiner*—Alyssa H. Bowler
*Assistant Examiner*—Mark H. Rinehart
*Attorney, Agent, or Firm*—Blakely, Sokoloff, Taylor & Zafman LLP

[57] ABSTRACT

A method and apparatus for transmitting and receiving information over a network that allows the detection of data transmission activity over a wire pair on the network. Within a computer system or other network device a driver-receiver circuit along with an activity detector circuit are coupled to the wire pair such that when the wire pair is inactive, an Inactive signal is asserted, and the activity detector circuit will notify the network device that the network is not currently transmitting data. The activity detector includes a first voltage comparator coupled to a first differential threshold voltage generator and a second voltage comparator coupled to a second differential threshold voltage generator. The absolute value of voltages generated by both differential threshold voltage generators is less than the minimum voltage levels required for a valid signal to be placed on the wire pair. The outputs of the first and second voltage comparators are coupled to an AND gate such that when the voltage differential across the wire pair is not sufficiently high to be a valid logic 1 or a valid logic 0, an Inactive signal is asserted. The Inactive signal, which indicates that the network is not currently transmitting data, is detected by the network device in which the driver-receiver circuit is incorporated.

24 Claims, 2 Drawing Sheets

METHOD AND APPARATUS FOR TRANSMITTING SIGNALS OVER A WIRE PAIR HAVING ACTIVITY DETECTION CAPABILITY

BACKGROUND OF THE INVENTION

1. Field of the Invention

The present invention relates generally to the field of computers and computer networks. More specifically, the present invention relates to a method and apparatus for transmitting and receiving data over a network having a circuit that detects whether data transmission activity is occurring over the network.

2. Related Art

Various standards for networking computer systems and other network devices through a wire pair are well known. One example of such a standard is the RS-485 interface standard. The RS-485 interface standard allows multiple network devices each having a driver-receiver circuit to be networked via a communication cable having at least one wire pair. In accordance with the RS-485 interface standard, the driver-receiver circuits are coupled in parallel to the wire pair such that a voltage differential placed on the wire pair can be detected simultaneously by each network device. Additionally, each network device can create a voltage differential across the wire pair at any time to transmit information to the other network devices.

Because the RS-485 interface standard allows each network device to transmit information over the wire pair at any time, some form of arbitration, scheduling or collision detection is needed to ensure that two network devices do not simultaneously attempt to drive the network. Otherwise, the conflict between the various drivers placing signals on the wire pair would result in unpredictable results. Conventional methods for preventing simultaneous attempts to transmit data over a network, which are often called "transmission collisions", include elaborate "token-passing" protocols. In these networks, each network device must wait until it is granted control of the wire pair before it may transmit data. An alternative method for preventing transmission collisions allows two or more network devices to simultaneously transmit information, but requires the receiving network devices to detect corrupt and faulty transmissions through the use of check sums, CRCs and other error detection schemes. Once a corrupt transmission is detected, an error signal is provided and the transmitting devices are required to retransmit the information.

These conventional transmission collision prevention methods have, however, several shortcomings. The use of a token passing protocol as described above requires each network device to track ownership of the network, and thus requires each network device to have extensive circuitry which adds to the overall complication and cost of the network. Additional circuitry is also required for the error detection scheme, and therefore this method also adds to the overall complication and cost of the network. In addition, the error detection scheme is inefficient because retransmits cause all transactions to be completed more slowly. This inefficiency is especially noticeable when the wire pair is in use a substantial percentage of the time.

Accordingly, it is desirable to provide a method and apparatus for transmitting and receiving data over a network having a circuit that detects data communications activity over a wire pair on the network, whereby the circuit can be implemented easily and reliably.

BRIEF SUMMARY OF THE INVENTION

Based on the foregoing, a method and apparatus for transmitting and receiving information over a network that allows the detection of data transmission activity over a wire pair on the network is described. Within a computer system or other network device, a driver-receiver circuit along with an activity detector circuit are coupled to the wire pair such that when the wire pair is inactive, an inactive signal is asserted and the activity detector circuit will notify the network device that the network is not currently transmitting data. The activity detector includes a first voltage comparator coupled to a first differential threshold voltage generator and a second voltage comparator coupled to a second differential threshold voltage generator. The absolute value of voltages generated by both differential threshold voltage generators is less than the minimum voltage level required for a valid signal to be placed on the wire pair. The outputs of the first and second voltage comparators are coupled to an AND gate such that when the voltage differential across the wire pair is not sufficiently high to be a valid logic 1, or valid logic 0, an Inactive signal is asserted. The inactive signal which indicates that the network is not currently transmitting data is detected by the network device in which the driver-receiver circuit is incorporated.

BRIEF DESCRIPTION OF THE DRAWINGS

The objects, features and advantages of the present invention will become apparent from the following detailed description of the present invention in which.

DETAILED DESCRIPTION OF THE INVENTION

The present invention relates to a method and apparatus for communicating over a wire pair on a network that can detect whether the wire pair is available for transmitting data. In the following description, various circuits, voltage levels and signals, including those associated with the RS-485 interface standard, are set forth in detail. It will be obvious, however, to one skilled in the art that these details are not required to practice the present invention. In other instances, various well known systems and circuits are shown in block form. This is done in order to avoid unnecessarily obscuring the disclosure of the present invention.

Figure 1:
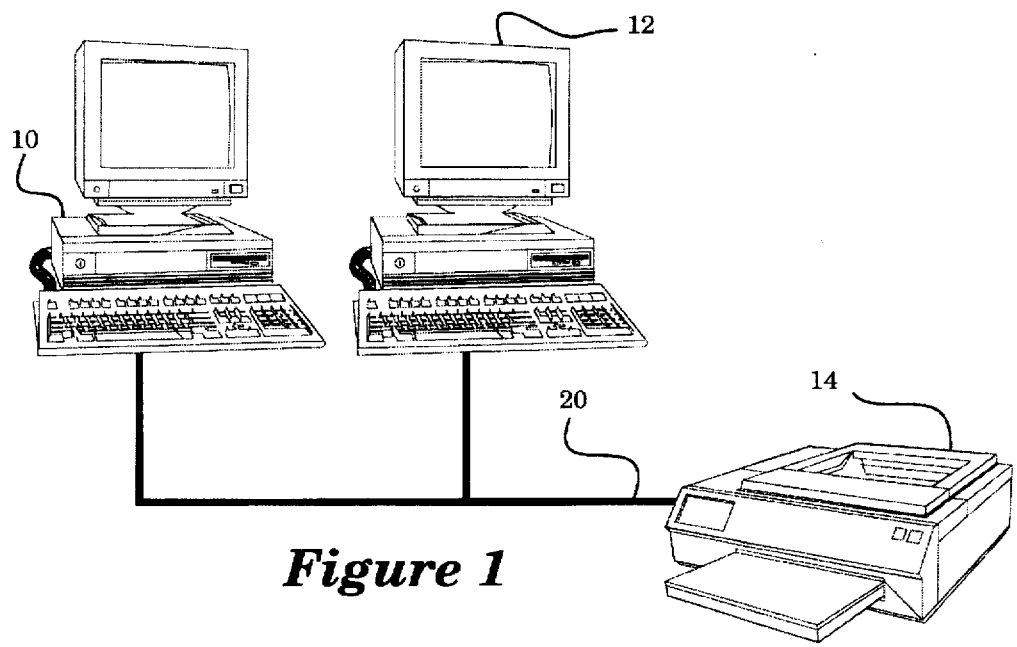
FIG. 1 is an illustration of two computer systems and a printer networked over a network line in accordance with one embodiment of the invention.

FIG. 1 is an illustration of two computer systems and a printer networked in accordance with one embodiment of the invention. Each of computer systems 10 and 12 and printer 14 are network devices that utilize an interface circuit (not shown in FIG. 1) that allows them to transmit and receive data across network line 20. This transmission and reception of data allows files, information, and control signals to be exchanged between the various network devices.

The transmission of data across the network occurs over at least one wire pair located within network line 20. For the network to function properly, only one network device may transmit data at any one time over the wire pair contained in network line 20. When data is being transmitted it can be received and examined by the other network devices coupled to network line 20. The data is transmitted in serial manner which involves sending individual bits represented by voltage across the wire pair within network line 20 one at a time and one after the other.

Figure 2:
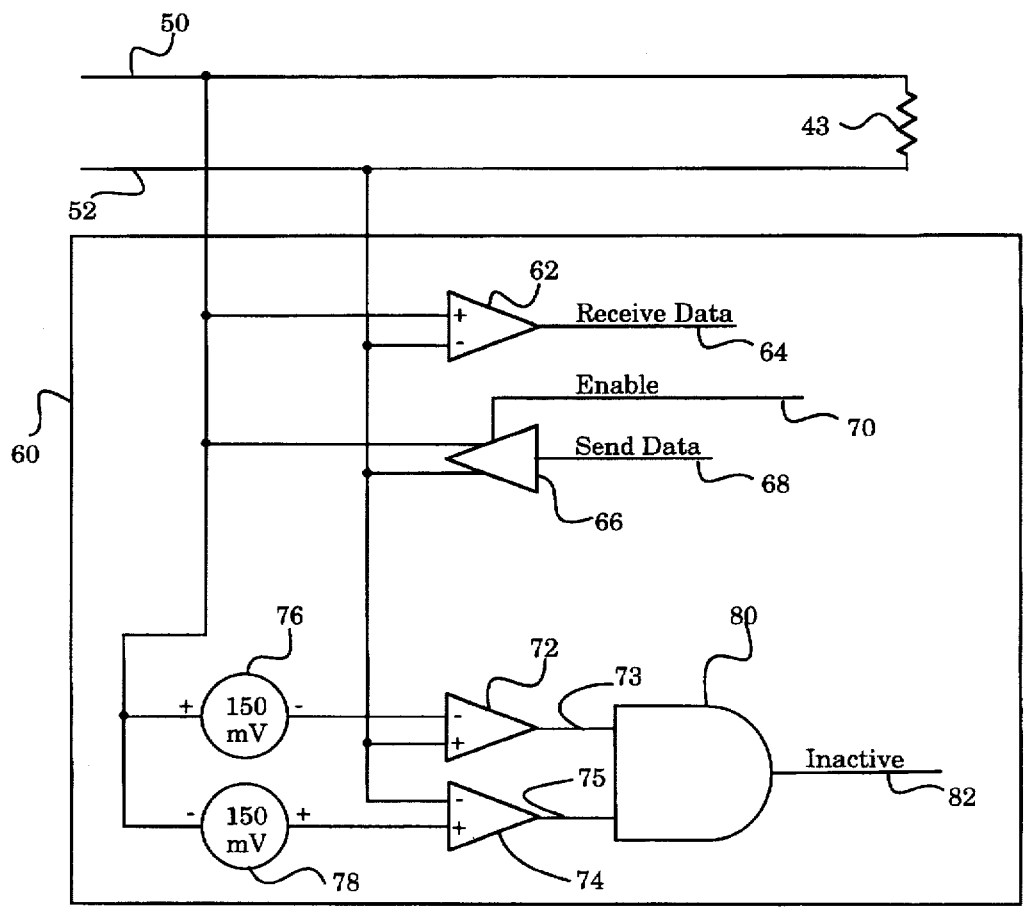
FIG. 2 is a circuit diagram of the circuit used to interface a network device with a wire pair inside the network line configured in accordance with one embodiment of the invention.

FIG. 2 is a circuit diagram of an interface circuit 60 coupled to the wire pair in network line 20 (FIG. 1), configured in accordance with a first embodiment of the invention. Interface circuit 60 is used by computer systems 10, 12 and printer 14 of FIG. 1 to receive and transmit data over the wire pair in network line 20. The wire pair comprised of signal lines 50 and 52 is terminated at either end by a resistor 43 (only one end shown). A typical value of the resistor 43 is 100 Ω. In accordance with the RS-485 interface standard, information on the network is represented by voltage differentials between lines 50 and 52 with a positive differential of greater than 1.0 volt representing a logic 0, and a negative differential of less than negative 1.0 volt representing a logic 1. The operation of the interface circuit 60 will be described in terms of its incorporation into computer system 10.

To allow computer system 10 to receive data, differential comparator 62 of interface circuit 60 detects the voltage differentials across lines 50 and 52 and asserts the appropriate logic level on data line 64 in response. The logic level on data line 64 is then received by computer system 10 which proceeds to process the information this logic level represents. For computer system 10 to transmit data using interface circuit 60, the desired logic level is placed on send data line 68 and enable line 70 is asserted. In response, driver circuit 66 generates a voltage differential across lines 50 and 52 corresponding to the logic level placed on send data line 68: greater than 1.0 volt for a logic 0, and less than negative 1.0 volt for a logic 1. When enable line 70 is not asserted, driver circuit 66 places a high impedance load across lines 50 and 52.

Simultaneous with this reading and writing activity, voltage comparators 72 and 74 of interface circuit 60 sense the voltage levels on signal lines 50 and 52. Voltage comparator 72 directly senses the voltage level on signal line 52 via its noninverting input, and senses the voltage level on line 50 through voltage source 76 via its inverting input. Voltage source 76 is configured to cause voltage comparator 72 to assert logic high on line 73 when the voltage level on signal line 50 is less than 150 mV above the voltage level on signal line 52. Voltage comparator 74 directly senses the voltage level on signal line 52 via its inverting input, and senses the voltage level on line 50 through voltage source 78 via its noninverting input. Voltage source 78 is configured to cause voltage comparator 74 to assert a logic high on line 75 when the voltage level on signal line 52 is less than 150 mV above the voltage level on signal line 50. The result is that when the absolute value of the voltage differential between lines 50 and 52 is 150 mV or less, voltage comparators 72 and 74 both assert logic highs, causing AND gate 80 to assert an Inactive signal on Inactive line 82. Voltage comparator 72 and 74 each has a voltage gain suitable for creating a voltage level recognized by the logic level 1 voltage as specified for the selected AND gate 80.

By asserting the Inactive signal on line 82 when the absolute value of the voltage differential across signal lines 50 and 52 is less than 150 mV, interface circuit 60 indicates that data is presently being transmitted over the wire pair 50 and 52. The RS-485 protocol, as well as many other communication protocols, require a voltage differential with an absolute value greater than 1.0 volt to be generated on a wire pair in order to indicate a valid logic level. Therefore, when the absolute value of the voltage differential across these signal lines is less than 150 mV, it can be inferred that no signal is being asserted. Thus, by providing a signal that indicates when such a condition occurs, interface circuit 60 indicates when the network is available for transmitting data.

The use of 150 mV offset voltage sources 76 and 78 ensures that false Inactive signals are not generated as a result of improperly calibrated network devices coupled to the wire pair 50 and 52. During operation of the network, such improperly calibrated interface circuit signals will assert a voltage level with an absolute value slightly less than the required 1.0 volt when actually attempting to assert a valid signal. The use of the 150 mV offsets creates a 850 mV differential between the point when a signal technically becomes invalid and the point where an Invalid signal is generated. This differential prevents a false Invalid from being asserted in response to these slightly miscalculated signals. Therefore, the use of the 150 mV voltage offsets reduces the likelihood of a false Inactive signal being asserted in response to improperly calibrated interface circuits being coupled to the network.

The use of the 150 mV voltage offsets also reduces the likelihood of false Invalid signals being asserted in response to slow logic transitions occurring across signal lines 50 and 52. During logic transitions the voltage levels asserted are invalid for a brief period of time. These invalid voltage levels may cause a false Inactive signal to be asserted if this period of time is sufficiently long to allow detection of the invalid voltage level by voltage comparators 72 and 74 to propagate through interface circuit 60 to Inactive line 82. By using the 150 mV offsets, the range at which a signal is detected as invalid is reduced 85 percent, from 2 volts to 0.3 volts, and therefore the period of time a false invalid reading can propagate through interface circuit 60 is also reduced. Thus, the use of 150 mV voltage offsets also reduces the likelihood of false Inactive signals being asserting in response to slow logic transitions.

Computer system 10 and other network devices incorporating the use of interface circuit 60 can utilize the Inactive signal provided on Inactive line 82 to minimize the number of transmission collisions that occur over the network, and thereby increase the network's overall efficiency. A network device such as computer system 10 incorporating the use of interface circuit 60 need only monitor the state of the Inactive line 82, and refrain from transmitting data until the Inactive signal is asserted. This will reduce or eliminate any collisions that occur over the network thus increasing the efficiency of data transmission. Additionally, interface circuit 60 is relatively simple and easy to implement and therefore provides this improved network efficiency at a low cost.

Figure 3:
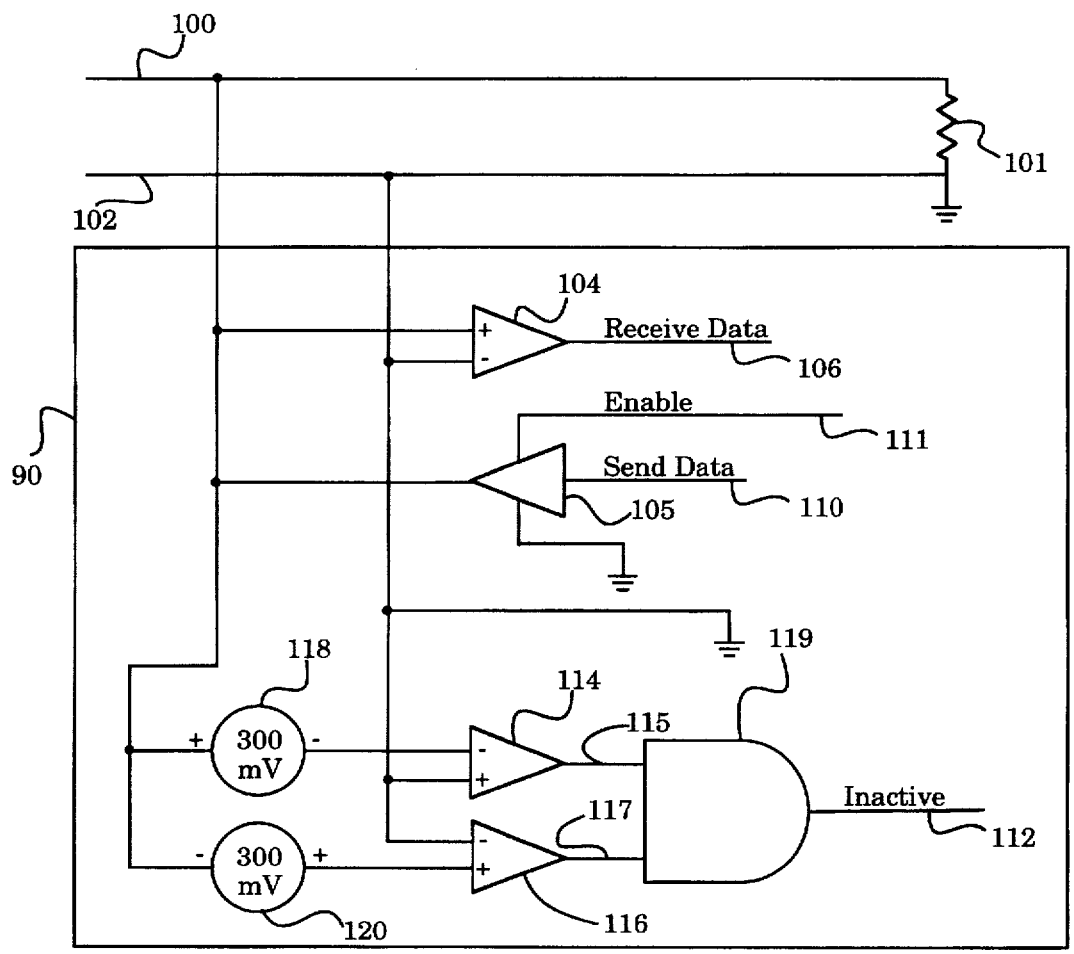
FIG. 3 is a circuit diagram of the circuit used to interface a network device with a wire pair inside the network line configured in accordance with an alternate embodiment of the invention.

FIG. 3 is a circuit diagram illustrating an alternate embodiment of the interface circuit 90 of the present embodiment coupled to a wire pair 100 and 102. The wire pair is composed of a wire 100 coupled through a resistor 101 to ground, and a wire 102 coupled directly to ground. A typical value of the resistor 101 is 12 kohms. During operation, information is received by input buffer circuit 104 which detects the voltage level on line 100 and asserts a corresponding logic signal on receive Data 106 in response. Data is driven out by driver 105 which receives data to be transmitted on send line 110, and generates a voltage differential with respect to ground on line 100 when enable line 111 is asserted by computer system 10. Line 102 is also coupled to ground inside transmitter receiver circuit 90.

During operation, voltage comparator 114 and offset voltage source 118 detect when the voltage level on line 100 is greater than positive 300 mV, and asserts a logic low on line 115 in response. Voltage comparator 116 and offset voltage source 120 detect when the voltage level on line 100 is greater than negative 300 mV, and asserts a logic low on line 117 in response. Thus, when the absolute value of the voltage level on line 100 is greater than 300 mV, either voltage comparator 114 or voltage comparator 116 will assert a logic low causing AND gate 119 to assert a logic low on Inactive line 112. This logic low indicates that data is currently being transmitted on lines 100 and 102. If, however, the absolute value of the voltage level on line 100 is less than 300 mV, voltage comparators 114 and 116 both assert logic highs on lines 115 and 117 respectively, causing AND gate 119 to assert a logic high Inactive signal on Inactive line 112, indicating the network is available for transmitting data.

The essential difference between interface circuit 90 of FIG. 3 and interface circuit 60 of FIG. 2 is that the voltage differentials used to indicate logic levels in interface circuit 90 are generated with respect to ground, as opposed to the "floating" differential used in interface circuit 60. In both embodiments, computer system 10 can use the Invalid signal generated on Inactive line 82 or 112 to refrain from transmitting data until the network is available and thereby increase the overall efficiency of the network. Also, like interface circuit 60, interface circuit 90 is relatively inexpensive to implement. By configuring interface circuit 90 to measure the voltage level generated with respect to ground, however, this second embodiment is compatible with single-ended communication standards such as the well known EIA/TIA-232E and EIA/TIA-562 communication standards which generate voltage levels with respect to ground rather than with respect to another signal line.

Thus, a method and apparatus for transmitting and receiving data over a network line having a single wire pair that prevents transmission collisions, and that can be implemented reliably and at a low cost is described. To those skilled in the art, alternative embodiments of the invention will be readily apparent. The example provided is merely for illustrative purposes and should not be taken as limiting the scope of the invention.

What is claimed is:

1. A circuit for detecting data communications activity over a wire pair on a network to which said circuit is coupled, said circuit comprising:
   a detection circuit for detecting a voltage differential across the wire pair representative of an Invalid logic level, said detection circuit including
      a first voltage comparator, coupled to the wire pair, for providing a first Invalid signal, and
      a second voltage comparator, coupled to the wire pair, for providing a second Invalid signal;
   a first offset voltage source for generating a first voltage offset coupled between said first voltage comparator and the wire pair;
   a second offset voltage source for generating a second voltage offset coupled between said second voltage comparator and the wire pair; and
   an output circuit for providing a network Inactive signal responsive to the output of the detection circuit.

2. The circuit as set forth in claim 1, wherein said first voltage comparator further detects said voltage differential that is greater than a first threshold value and said second voltage comparator further detects said voltage differential that is less than a second threshold value.

3. The circuit set forth in claim 1, further comprising:
   a driver circuit for generating said voltage differential across the wire pair; and
   a receiver circuit for generating an internal logic signal in response to said voltage differential across the wire pair.

4. The circuit as set forth in claim 1, wherein said output circuit comprises:
   AND gate for generating said network Inactive signal in response to said first Invalid signal and said second Invalid signal.

5. The circuit as set forth in claim 2, wherein said first threshold value is less than said second threshold value.

6. The circuit as set forth in claim 2, wherein said first threshold value is −150 mV and said second threshold value is 150 mV.

7. A circuit for detecting data communications activity over a wire pair on a network to which said circuit is coupled, said circuit comprising:
   means for detecting a voltage differential across the wire pair representative of an Invalid logic level, said means for detecting includes
      first voltage comparator means, coupled to the wire pair, for providing a first Invalid signal, and
      second voltage comparator means, coupled to the wire pair, for providing a second Invalid signal;
   means for generating a first voltage offset coupled between said first voltage comparator means and the wire pair;
   means for generating a second voltage offset coupled between said second voltage comparator means and the wire pair; and
   means for providing a network Inactive signal responsive to the output of said means for detecting.

8. The circuit as set forth in claim 7, wherein said first means further includes means for detecting said voltage differential that is greater than a first threshold value and said second means further includes means for detecting said voltage differential that is less than a second threshold value.

9. The circuit set forth in claim 7, further comprising:
   means for generating said voltage differential across the wire pair in response to a first internal logic signal; and
   means for generating a second internal logic signal in response to said voltage differential across the wire pair.

10. The circuit as set forth in claim 7, wherein said means for providing comprises:
    AND gate means for generating said network Inactive signal in response to said first Invalid signal and said second Invalid signal.

11. The circuit as set forth in claim 8, wherein said first threshold value is less than said second threshold value.

12. The circuit as set forth in claim 8, wherein said first threshold value is −150 mV and said second threshold value is 150 mV.

13. A method for detecting data communications activity over a wire pair on a network to which said circuit is coupled, said method comprising the steps of:
    a) detecting a voltage differential across the wire pair representative of an Invalid logic level, said detecting step includes the steps of
       a.1) providing a first Invalid signal in response to said voltage differential that is less than a first value, and
       a.2) providing a second Invalid signal in response to said voltage differential that is greater than a second value;

b) generating a first voltage offset between the wire pair and a first voltage comparator;

c) generating a second voltage offset between the wire pair and a second voltage comparator; and d) providing a network Inactive signal responsive to the result of said detection step.

14. The method as set forth in claim 13, wherein step a) further comprises the steps of:

a.3) detecting said voltage differential that is greater than a first threshold value; and a.4) detecting said voltage differential that is less than a second threshold value.

15. The circuit set forth in claim 13, further comprising the steps of:

generating said voltage differential across the wire pair; and generating an internal logic signal in response to said voltage differential across the wire pair.

16. The circuit as set forth in claim 13, wherein step d) comprises the step of:

generating said network Inactive signal in response to said first Invalid signal and said second Invalid signal.

17. The circuit as set forth in claim 14, wherein said first threshold value is less than said second threshold value.

18. The circuit as set forth in claim 14, wherein said first threshold value is −150 mV and said second threshold value is 150 mV.

19. A device coupled to a network, the device having a circuit for detecting data communications activity on the network, the circuit comprising:

a detection circuit for detecting if said network is currently transmitting data, said detection circuit including a first voltage comparator, coupled to the wire pair, for providing a first Invalid signal, and a second voltage comparator, coupled to the wire pair, for providing a second Invalid signal;

a first offset voltage source for generating a first voltage offset coupled between said first voltage comparator and the wire pair;

a second offset voltage source for generating a second voltage offset coupled between said second voltage comparator and the wire pair; and an output circuit for providing a network Inactive signal responsive to the output of said detection circuit.

20. The device as set forth in claim 19, wherein said first voltage comparator further detects said voltage differential that is greater than a first threshold value and said second voltage comparator further detects said voltage differential that is less than a second threshold value.

21. The circuit set forth in claim 19, further comprising:

a driver circuit for generating said voltage differential across the wire pair; and a receiver circuit for generating an internal logic signal in response to said voltage differential across the wire pair.

22. The circuit as set forth in claim 19, wherein said output circuit comprises:

AND gate for generating said network Inactive signal in response to said first Invalid signal and said second invalid signal.

23. The circuit as set forth in claim 20, wherein said first threshold value is less than said second threshold value.

24. The circuit as set forth in claim 20, wherein said first threshold value is −150 mV and said second threshold value is 150 mV.

* * * * *